(12) United States Patent
Odenwald, Jr.

(10) Patent No.: US 9,098,436 B2
(45) Date of Patent: Aug. 4, 2015

(54) RELATIONAL ADMINISTRATION OF SAS DOMAIN MANAGEMENT DATA

(75) Inventor: Louis Henry Odenwald, Jr., Wichita, KS (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 495 days.

(21) Appl. No.: 13/050,175

(22) Filed: Mar. 17, 2011

(65) Prior Publication Data

US 2012/0239837 A1   Sep. 20, 2012

(51) Int. Cl.
*G06F 13/00* (2006.01)
*G06F 13/14* (2006.01)

(52) U.S. Cl.
CPC ........................... *G06F 13/14* (2013.01)

(58) Field of Classification Search
CPC .... G06F 3/0689; G06F 13/00; G06F 11/2089

USPC ................ 710/104, 313, 300, 305–306, 100; 711/114; 709/225–226

See application file for complete search history.

(56) References Cited

U.S. PATENT DOCUMENTS

| | | | |
|---|---|---|---|
| 7,437,462 B2 | 10/2008 | Marks et al. | |
| 7,536,508 B2 * | 5/2009 | Davies | 711/114 |
| 8,402,196 B2 * | 3/2013 | Davis et al. | 710/313 |
| 8,464,279 B2 * | 6/2013 | Gutjahr et al. | 719/318 |
| 2004/0083284 A1 * | 4/2004 | Ofek et al. | 709/224 |
| 2006/0230125 A1 * | 10/2006 | Johnson | 709/220 |
| 2009/0094620 A1 * | 4/2009 | Kalwitz et al. | 719/325 |
| 2009/0319652 A1 * | 12/2009 | Odenwald et al. | 709/223 |
| 2010/0115073 A1 | 5/2010 | Odenwald, Jr. et al. | |

* cited by examiner

*Primary Examiner* — Tim T Vo
*Assistant Examiner* — Kim T. Huynh
(74) *Attorney, Agent, or Firm* — Duft Bornsen & Fettig

(57) ABSTRACT

Disclosed is a process that is performed by a management application for automatically mapping the topology of one domain to another domain. In addition, if a device in a domain fails, the domain application can automatically associate replacement devices with predecessor management objects.

20 Claims, 9 Drawing Sheets

800
Importing Domain
MATCH

100 Domain Topology Data Map

TOPOLOGY:

| | | Device | | | Parent | |
|---|---|---|---|---|---|---|
| Type | Phys | SAS Address | Phys | | SAS Address | Phys |
| 204— Expander | 208 36+2 | 500508b300a242cf ←—206 | | 218 | 202 Root Address 0000000000000000 | |
| 210— End | 212 01 | 500508b300a242cc | 00—216 | 214 | 500508b300a242cf | 12 ←—220 |
| Expander | 36+2 | 500508b300a242df | 10-11 | | 500508b300a242cf | 00-01 |
| End | 01 | 500000e011b73c32 | 00 | | 500508b300a242df | 00 |
| End | 01 | 500000e011b2c542 | 00 | | 500508b300a242df | 01 |
| End | 01 | 500000e011bc3cd2 | 00 | | 500508b300a242df | 08 |
| End | 01 | 500000e011c71262 | 00 | 232 | 500508b300a242df | 09 —234 |
| Expander | 36+2 | 500605b000101280 | 08-09-10-11 | | 500508b300a242cf | 04-05-06-07 ←236 |
| 226 End | 228 04 | 230 500605b000010b54 | 04-05-06-07 | | 500605b000101280 | 20-21-22-23 |
| End | 01 | 500605b0001012bd | 00 | | 500605b000101280 | 36 |
| Expander | 36+2 | 500605b000024402 | 00-01-02-03 | | 500605b000101280 | 00-01-02-03 |
| End | 01 | 500605b00002441c | 00 | | 500605b000024402 | 28 |
| End | 01 | 500605b00002441d | 00 | | 500605b000024402 | 29 |
| End | 01 | 500605b00002443d | 00 | | 500605b000024402 | 36 |

Fig. 2

300 Domain Topology Data Map

TOPOLOGY:

|  |  | Device—304 |  |  | Parent—302 |  |
|---|---|---|---|---|---|---|
| Type | Num Phys | SAS Address | Phys |  | SAS Address | Phys |
| Expander | 36+2 | 5005083ca0012dcf |  |  | 0000000000000000 |  |
| End | 01 | 500508b300a21acc | 00 |  | 5005083ca0012dcf | 12 |
| Expander | 36+2 | 500508cc85639adf | 10-11 |  | 50050803ca0012dcf | 00-01 |
| End | 01 | 500000e011b787a2 | 00 |  | 500508cc85639adf | 00 |
| End | 01 | 500000e011cac542 | 00 | 312 | 500508cc85639adf | 01 |
| End | 01 | 500000e011b876d2 | 00 |  | 500508cc85639adf | 08 |
| End | 01 | 500000e011c23462 | 00 |  | 500508cc85639adf | 09 |
| Expander | 36+2 | 500605b0001ab180 | 08-09-10-11 |  | 5005083ca0012dcf | 04-05-06-07 |
| End | 04 | 500605b000034a54 | 04-05-06-07 |  | 500605b0001ab180 | 20-21-22-23 |
| End | 01 | 500605b000164dbd | 00 | 308 | 500605b0001ab180 | 36 |
| Expander | 36+2 | 500605b008283cb2 | 00-01-02-03 |  | 500605b0001ab180 | 00-01-02-03 |
| End | 01 | 500605b00008c36c | 00 |  | 500605b008283cb2 | 28 |
| End | 01 | 500605b00004dcbd | 00 |  | 500605b008283cb2 | 29 |
| End | 01 | 500605b00003a6cd | 00 |  | 500605b008283cb2 | 36 |

RELATIONAL ADMINISTRATION OF SAS DOMAIN MANAGEMENT DATA

BACKGROUND

Serial attached SCSI (SAS) is a computer bus that is used to move data to and from computer storage devices, such as hard drives and tape drives. SAS depends on point to point serial protocol. Typical serial attached SCSI systems include an initiator, which is a device that originates service and requests for processing by a target device and receives responses for these requests from the target devices. An initiator may comprise a controller or host device. Targets are devices containing logical units and target ports that receive device service and task management requests for processing, and send responses for the same requests to initiator devices. Target devices may comprise a hard disk or disk array. Expanders are devices that facilitate communication between the SAS devices and facilitate the connection of multiple SAS end devices. A phy is a physical link that connects an SAS device to another SAS device. A port is a collection of one or more phys.

SUMMARY

An embodiment of the present invention may therefore comprise a method of porting domain configuration data from a first domain to a second domain comprising: creating a first domain topology map for the first domain having a first domain topology; creating a second domain topology map for a second domain having a second domain topology; comparing the first domain topology with the second domain topology; matching objects in the first domain topology map with corresponding objects in the second domain topology map whenever the first domain topology matches the second domain topology; mapping the configuration data from the objects in the first domain to objects in the second domain based on relationships formed on the basis of relative positions of the objects in the first domain topology map with the corresponding objects in the second domain topology map.

An embodiment of the present invention may further comprise a method of automatically associating a replacement object in a managed SAS domain comprising: generating domain management configuration information for a domain; generating a domain topology map from the domain management configuration information; identifying an object in the domain topology map for replacement; using data from the domain topology map to associate the replacement object in the domain.

An embodiment of the present invention may further comprise a method of porting domain configuration data from a first domain to a second domain comprising: creating a first domain topology map for the first domain having a first domain topology; creating a second domain topology map for a second domain having a second domain topology; comparing the first domain topology with the second domain topology; matching objects in the first domain topology map with corresponding objects in the second domain topology map whenever the first domain topology matches the second domain topology; mapping the configuration data from the objects in the first domain to the corresponding objects in the second domain based on relationships between the objects in the first domain and the corresponding objects in the second domain as determined by relative positions of the objects in the first domain topology map and corresponding objects in the second domain topology map.

BRIEF DESCRIPTION OF THE DRAWINGS

FIG. 2 is an illustration of a domain topology map of the first managed domain that is generated from the domain management configuration information of FIG. 1.

FIG. 3 is an illustration of a domain topology map of a second managed domain.

DETAILED DESCRIPTION OF THE PREFERRED EMBODIMENTS

Figure 1:
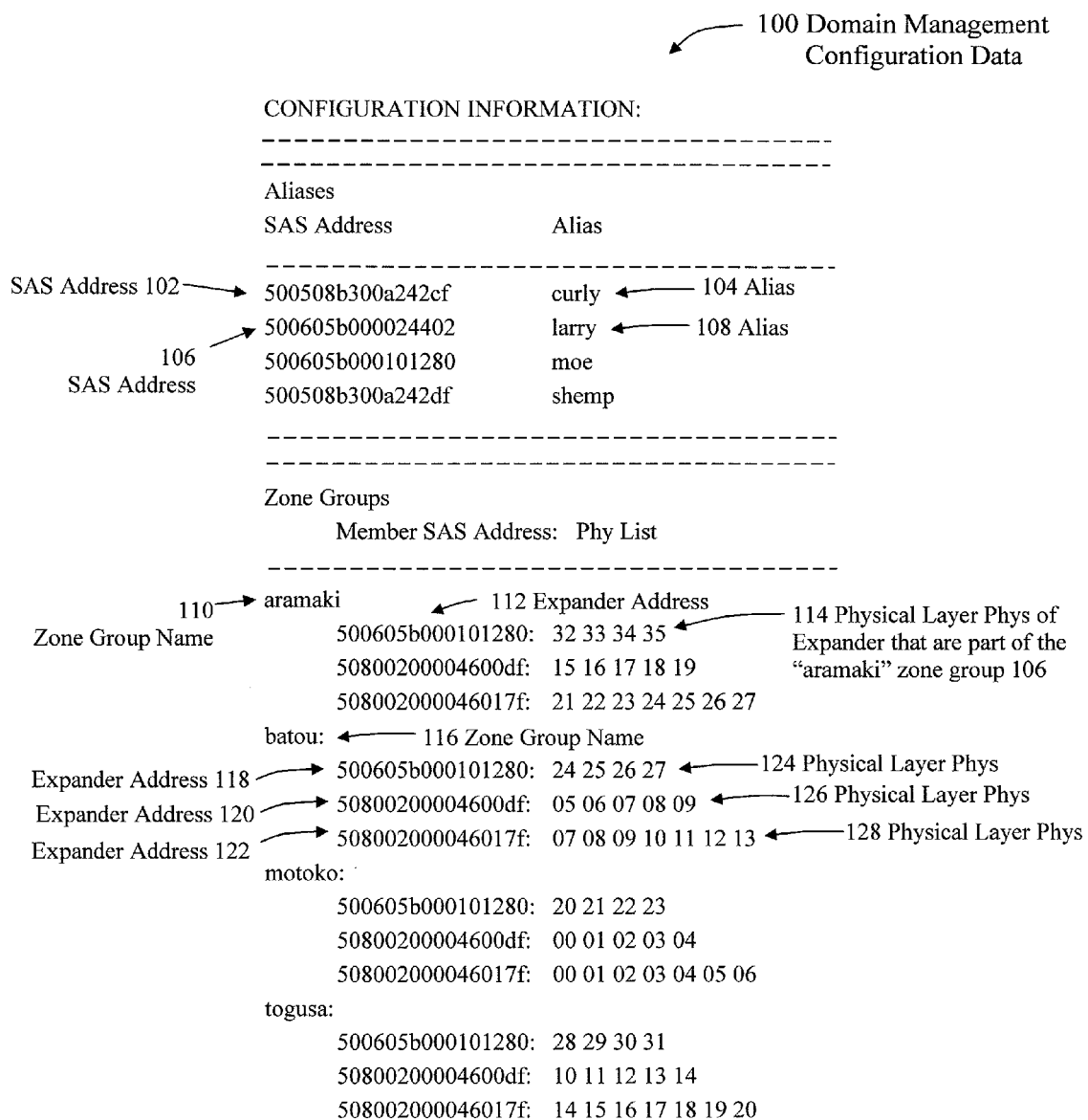
FIG. 1 is an illustration of domain management configuration information for a first managed domain.

FIG. 1 is an illustration of an example of domain management configuration information for an exporting domain that illustrates the use of aliases and zone groups. As shown in FIG. 1, aliases can be associated with the SAS addresses of both end devices and expanders. For example, SAS address 102 has an alias 104 of "curly." SAS address 106 has an alias 108 of "larry." The aliases assist the user and the user interface in identifying the device, such as a particular target, initiator or expander.

FIG. 1 also illustrates four different zones, including aramaki, batou, motoko, and togusa. Under each zone group, the address of the expander is listed, together with the physical phy interconnectivity information. Domain management applications utilize this information to manage the SAS network. Zone groups control the accessibility of devices within a domain. For example, a domain may provide a high degree of connectivity between an initiator and a target. However, expanders may be programmed to only allow an initiator to access certain ports on the expander to thereby limit the accessibility of the initiator to a target. Zoning functions to limit the access of an initiator to only a specific set of targets, even though interconnectivity provided by the domain would otherwise allow access. In other words, a particular initiator may only have access to a subset of targets within a larger set of targets that are interconnected to an initiator through one or more expanders. The expanders are programmed to limit access of an initiator to a subset of physical phys on the expander, which limits the initiator's access to particular targets. A management application, through a user interface, establishes and maintains these zones.

As is apparent from FIG. 1, the domain configuration is tightly bound to SAS addresses of devices present in the managed domain. As disclosed above, alias 104 (curly) is tied to SAS address 102. Alias 108 (larry) is tied to SAS address 106. Further, zone group 110, which is called "aramaki," includes expander addresses 112 for three different expanders and physical layer phys 114 associated with the expander addresses 112 within the zone group 110. For example, zone group 116 (batou) has an expander address 118 and the associated physical layer phys 124. Similarly, expander address 120 has the associated physical layer phys 126. Expander address 122 has associated physical layer phys 128. As such, the information for the zone group 116 is specifically tied to expander addresses and physical layer phys. Since the configuration information is tightly bound to the SAS addresses, porting the configuration information from one domain to another is difficult and has not been performed in an automated fashion. For example, the simple act of swapping a faulty device with a replacement within a management domain is cumbersome, requiring an administrator to redefine configuration definitions for the new domain.

Many SAS networks are configured to have redundant domains in which end devices, such as targets and initiators, are connected through two separate domains. The deployment of two different domains in this manner ensures continued operability in the event one domain becomes unstable or goes offline. In the redundant domain configuration, the redundant domains can be physically wired and configured to be identical to one another. Even so, the process of porting the configuration data from one domain to another is difficult because the porting configuration information is bound to the SAS addresses of the devices in that domain. In other words, each of the devices in a particular domain has no association with devices in other domains. As a result, an administrator managing two redundant domains, such as domain 1 and domain 2, must manually configure aliases and zone groups for domain 1, and then manually enter similar configurations for devices in domain 2, to create a redundant or cloned SAS domain, for example, when domain one becomes inoperable. As indicated above, the administrator is forced to manually configure both domains, even though the configurations are identical, except for the SAS addresses. In accordance with embodiments of the present invention, a management application is able to automatically map configuration data onto the redundant copy of a domain, once the administrator has manually entered the domain configuration information of the domain. The process of requiring an administrator to manually enter configuration data for each domain is burdensome and problematic. In addition, because of the complexity of the process of configuring new domains, there may be a high probability of user error.

As another example, an administrator may wish to swap a device in a managed domain. If a device is swapped, an administrator is forced to reconfigure the aliases and zone groups that are bound to the SAS address of the failed device, with the SAS addresses of a new device. In accordance with embodiments of the present invention, the management application is able to automatically map configuration data associated with the old device to the replacement device.

Further, the view of a domain from a domain manager may differ from one domain to another, even though two domains are constructed in exactly the same configuration. For example, a domain manager for domain 1 may have a different access point and view of the devices within domain 1, than a domain manager for domain 2, even though domain 1 and domain 2 are identically wired, if access to domain 2 is from a different device. A domain management application may construct a view of domain 1 based from a particular root expander, such as a root expander that is deterministically discovered within the domain, such as a zoning expander with the highest SAS address. Since different SAS addresses are used in each domain, two domains that are physically identical may have root expanders positioned in different locations within the topology based upon the SAS addresses of the devices in each domain, which may determine the access point of the management application to the domain. As such, the topology of the two identically wired domains leads to a different view of each of the domains from the perspective of a domain manager that has a different access point.

FIG. 2 is an illustration of the domain topology map 200 that is derived from the domain management configuration data illustrated in FIG. 1. As shown in FIG. 2, the device column 224 lists each of the devices in the domain by type, the number of physical phys, the SAS address of each device, and the phy identifier of each device. The parent column 222 lists the SAS address of the parent devices for each of the devices listed in column 224 and the phy identifier of the parent, to which the device is connected. From the data shown in FIG. 2, expander 204 has 36+2 (36 physical phys, 2 virtual phys) physical ports 208 and has an SAS address 206. The SAS address of the parent of expander 204 is address 202, which is the root address for the domain, as indicated by all zeros in SAS address 202. End device 210 has one physical port 212 and has an SAS address 214. The physical port for end device 210 is shown as physical port 216. The SAS address 218 of end device 210 is the SAS address of expander 204, indicating that end device 210 is connected to expander 204. Physical address 220 is the physical address of the port of the parent device, which is expander 204, to which end device 210 is connected. As such, end device 210 is connected to phy 12 of expander 204. The remaining domain topology data is listed in FIG. 2, which provides all of the interconnections of each of the devices in the domain, including the SAS addresses of the devices and the physical phys. In this manner, all of the domain topology of the data sample 100 is provided in the domain topology map 200, illustrated in FIG. 2. Utilizing the domain topology map 200, illustrated in FIG. 2, the configuration data of one domain can be automatically ported to a redundant domain, so it may be utilized if the first domain becomes inoperable. Further, replacement of devices within a domain having new SAS addresses can be automatically configured into an existing domain if a device becomes inoperable.

The process of allowing a SAS domain management application to import and/or restore configuration information, including aliases, zone groups, etc. is performed in a relational manner. As such, the domain topology map, such as the domain topology map illustrated in FIG. 2, is obtained for each domain. The relationships defined in the domain topology map are then used to import the domain topology configuration data from an existing managed domain (exported domain) to a new domain (imported domain). Alternatively, the relationships defined in the domain topology data map 200 can be used to automatically restore configuration information once a new device has been inserted into a managed domain, as a replacement for a failing unit. The domain topology data map 200 of FIG. 2 provides the relational data for porting a domain topology to another topology. Hence, the mapping of topologies is not a direct mapping of objects, but rather, a mapping of relationships between the objects, to ensure that the exporting topology can be ported to the importing topology and new SAS addresses can be assigned. The relationships are based upon relative positions of the objects in topology maps.

FIG. 3 is a domain topology data map 300 that illustrates the domain topology of a redundant domain of the domain illustrated in FIGS. 1 and 2. As shown in FIG. 3, the domain topology data map 300 lists the devices 304 and parent devices 302. The type of device, the number of physical phys, the SAS addresses, the phy identifiers, the SAS addresses of the parent, and the phy identifiers of the parent, are all listed for the redundant domain, in the same manner as they are listed in FIG. 2. As illustrated in FIG. 3, the eighth device down in the domain topology list is an expander 306, which has the number of physical phys 310, illustrated as 36+2, a SAS address 308, and phy identifiers 312. The parent device associated with expander 306 is located at address 314 and has phys 316 activated. Referring to FIG. 2, it can be seen that expander 226 is the eighth device in the domain topology data map 200. In addition, expander 226 has the number of physical phys 228 equal to 36+2, an SAS address of 230, and phy identifiers 232. In addition, the parent device of expander 226 has an SAS address 234 and phy identifiers 236. A comparison shows that the number of phys 228 of expander 226 is equal to the number of phys 310 of expander 306. Further, the actuated port numbers 232 of expander 226 are the same as the phy identifiers 312 of expander 306. Further, the parent device of expander 226 has phy identifiers 236, which match the phy identifiers 316 of the parent device of expander 306. Hence, the only information that differs between expander 226 and expander 306 is the SAS address 308 of expander 306, which does not match the SAS address 230 of expander 226. Further, the SAS address 234 of expander 226 is different from the SAS address 314 of expander 306. However, the activated phy identifiers 236 of expander 226 match the phy identifiers 316 of expander 306. Hence, there is a match, except for the SAS addresses of the device and the parent device. A comparison of the other devices in FIG. 2 with the devices listed in FIG. 3 illustrates the manner in which the domain topology 200 can be ported to the domain topology 300 and provide new SAS addresses.

In addition, if expander 226 of FIG. 2 fails, expander 226 can be replaced with a new expander having a new address, and the new expander can be configured to have the same number of phys 228, the same phys 232, and connections to the parent at address 234.

In order to successfully import configuration information, the overall domain topology of the importing domain must match the existing topology of the existing domain. For example, the following conditions must be met: 1) the set consisting of the devices of the importing topology must match, or be a super-set of, the devices in the existing topology. In other words, there must be the same number of devices in the importing domain as the exporting domain, or there must be fewer devices in the exporting domain than the importing domain. That is, the number of devices in FIG. 3 must match the number of devices in FIG. 2, or the devices in FIG. 2 must be less than the number of devices in FIG. 3; 2) the relationships between the set of devices and the importing topology must match the relationship in the existing topology. This means that the relationship between the expanders and the end devices must be same to map the topology from one domain to another; 3) the physical phys used to connect the set of devices in the importing topology must match the physical phys in the existing topology. For example, the physical phys 312, 316 must match the physical phys 232, 236, respectively.

Figures 4, 5:
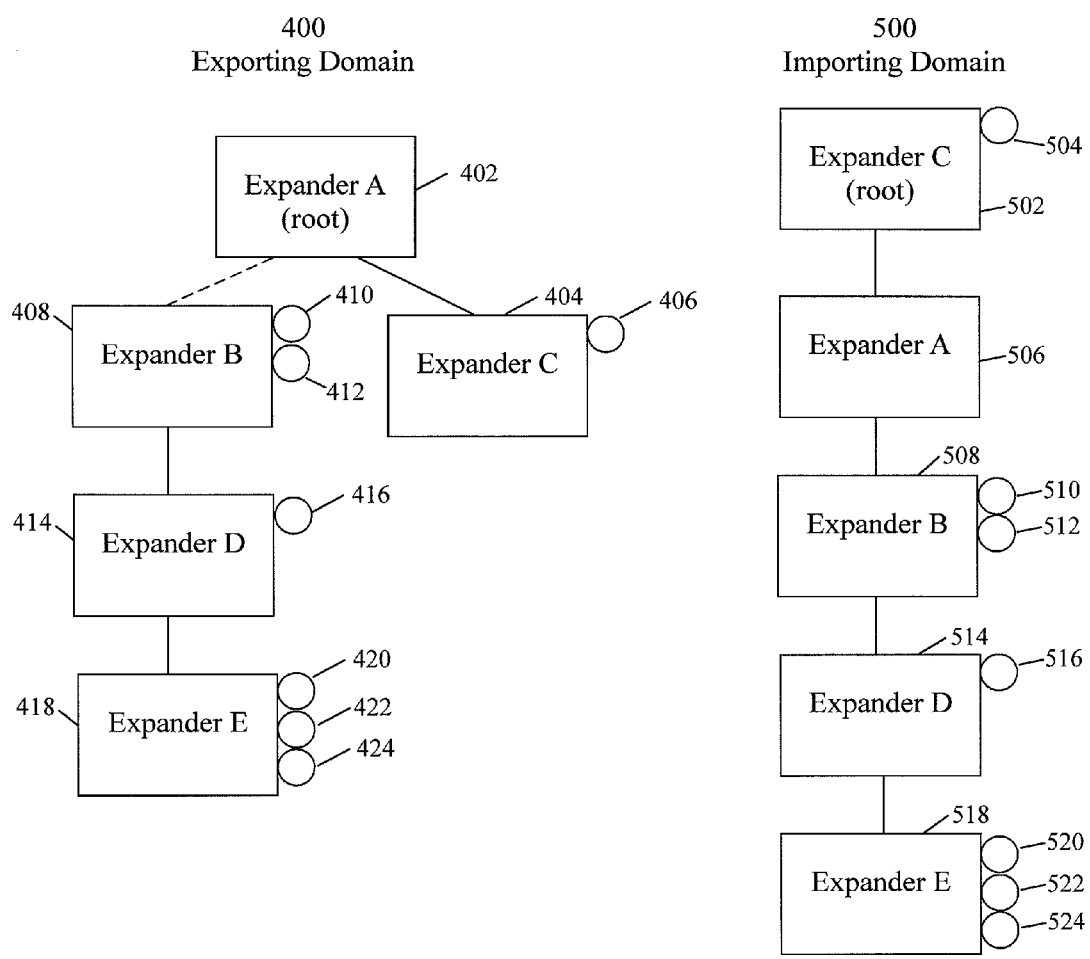
FIG. 4 is a schematic block diagram illustrating the topology of an embodiment of an exporting domain.
FIG. 5 is a schematic block diagram of one possible topology for an importing domain.

As indicated above, even though the two domains are identically wired, the domain topologies of two identically wired domains may appear to be different, based upon the management application's view of the domain. As also described above, an algorithm may be used by the management routine to deterministically identify a root expander that is different than the root expander in the exporting domain, which results in a topology that has a different shape and appears to be different from the exporting domain topology. For example, an exporting domain 400 may have a topology, such as illustrated in FIG. 4. The root expander 402 is expander A in the exporting domain 400. Attached to expander 402 is expander C 404, having an end device 406 and expander B 408, having end devices 410, 412. Expander C 404 is not connected to any other expanders. Expander B 408 is connected to expander D 414. Expander D 414 has one end device 416. Expander D is connected to expander E 418, having end devices 420, 422, 424. As illustrated in FIG. 5, the importing domain has expander C 502 as the root expander. Expander C has one end device 504. As shown in FIG. 4, expander C 404 has one end device 406 and is connected to expander A 402, which is the root expander. As illustrated in FIG. 5, expander C 502 is connected to expander A 506, which is the same structure as shown in exporting domain 400, of FIG. 4. Expander A 506 does not have any end devices to which expander A 506 is connected, which is the same as expander A 402 of FIG. 4. Expander A 506 of FIG. 5 is connected to expander B 508, having two end devices 510, 512. Expander B 508 is connected to expander D 514, having one end device 516. Expander D 514 is connected to expander E 518, having three end devices 520, 522, 524. A comparison of FIGS. 4 and 5 illustrates that expander B 508 is connected to expander A 506 and expander D 514. Similarly, expander B 408 is connected to expander A 402 and expander D 414. Further, expander B 508 has two end devices 510, 512, while expander B 408 has two end devices 410, 412. Similarly, expander D 514 is connected to expander B 508 and expander E 518. Expander D 514 has one end device 516. As illustrated in FIG. 4, expander D 414 is connected to expander B 408 and expander E 418. Expander D 414 also has one end device 416. Hence, the structure and connections of expander D 514 match the connections and structure of expander D 414. Expander E 518 is connected to expander D 514. Expander E 518 has three end devices 520, 522, 524. As shown in FIG. 4, expander E 418 is connected to expander D and has four end devices 420, 422, 424. Hence, expander E 518 matches the connections and structure of expander E 418. The difference between the importing domain 500 of FIG. 5 and the exporting domain 400 of FIG. 4 is simply the expander that has been selected as a root expander. The expander A 402 of exporting domain 400 of FIG. 4 is the root expander. Expander C 502 of importing domain 500 is the root expander of the importing domain 500 of FIG. 5. If expander A 506 of importing domain 500 were made to be the root expander, importing domain 500 would have the same topology as exporting domain 400.

Figure 6:
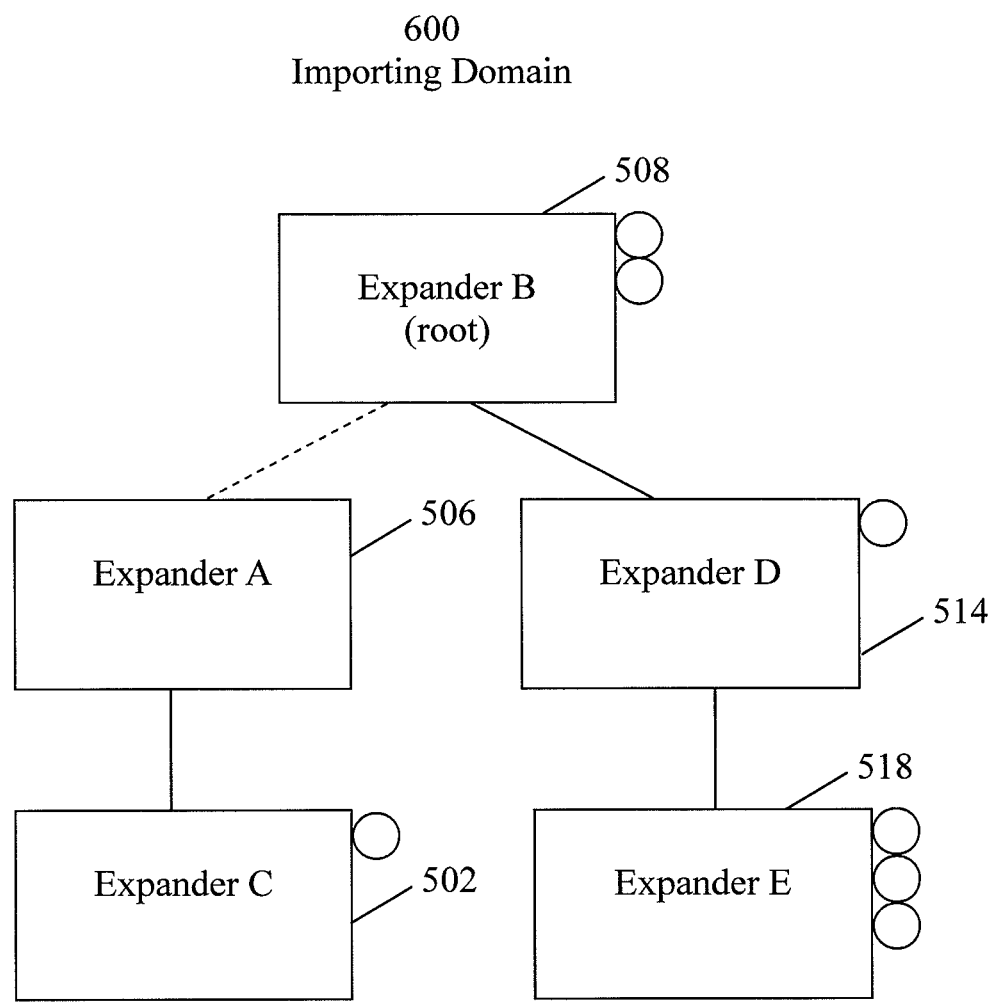
FIG. 6 illustrates another possible topology for an importing domain.

The process of determining whether an importing domain, such as importing domain 500, has the same topological structure as an exporting domain, such as exporting domain 400, each of the expanders in the importing domain can be selected as a root expander and then the topologies can be compared to determine if the topologies map. For example, the importing domain 600 of FIG. 6 selects the expander B 508 as the root expander. Expander A 506 is connected to expander B 508 and to expander C 502. Similarly, expander B 508 is connected to expander D 514, which, in turn, is connected to expander E 518. Comparing importing domain 600 of FIG. 6 with exporting domain 400 of FIG. 4, there is no match between the topologies.

Figure 7:
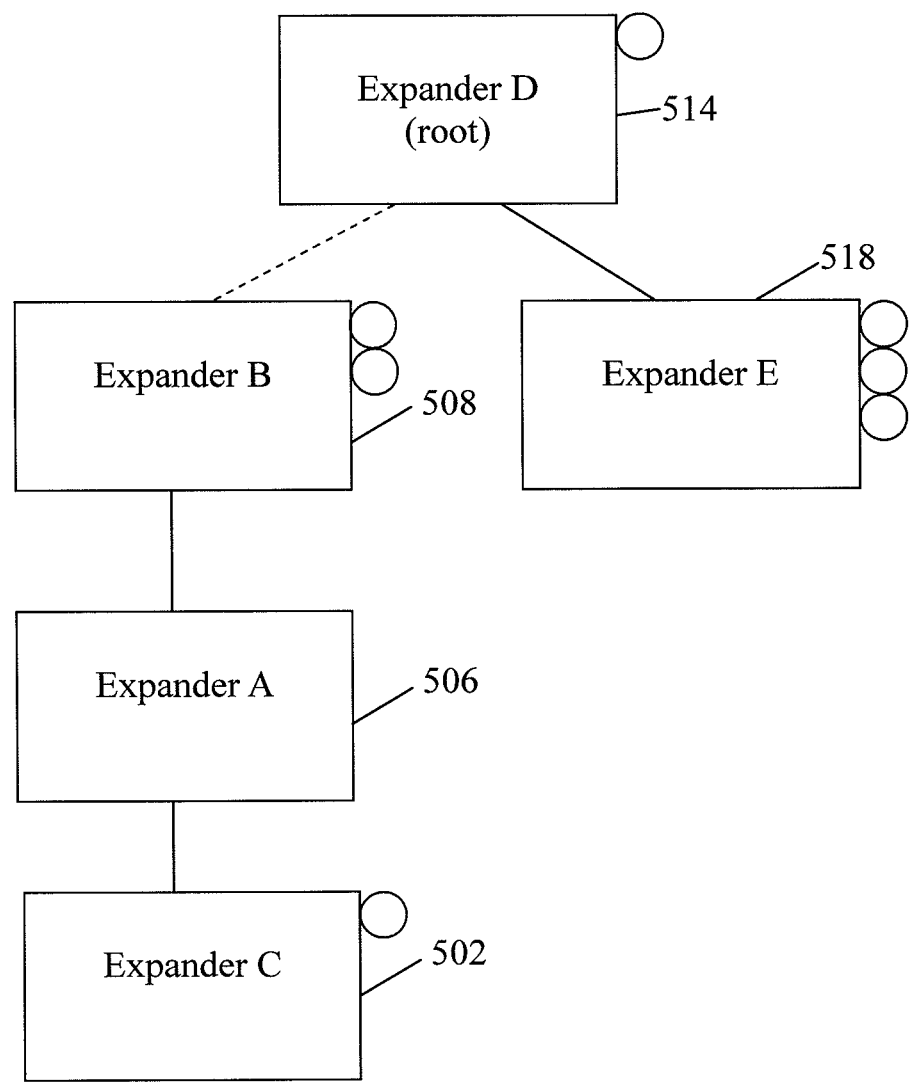
FIG. 7 illustrates another possible topology for an importing domain.

FIG. 7 is another illustration of an importing domain 700. As shown in FIG. 7, expander D 514 is selected as the root expander. Root expander D 514 is connected to expander E 518 and expander B 508. Expander B 508 is connected to expander A 506. Expander A 506 is connected to expander C 502. Using expander D 514 as the root expander, there is no match between the importing domain 700 of FIG. 7 and the importing domain 400 of FIG. 4.

Figure 8:
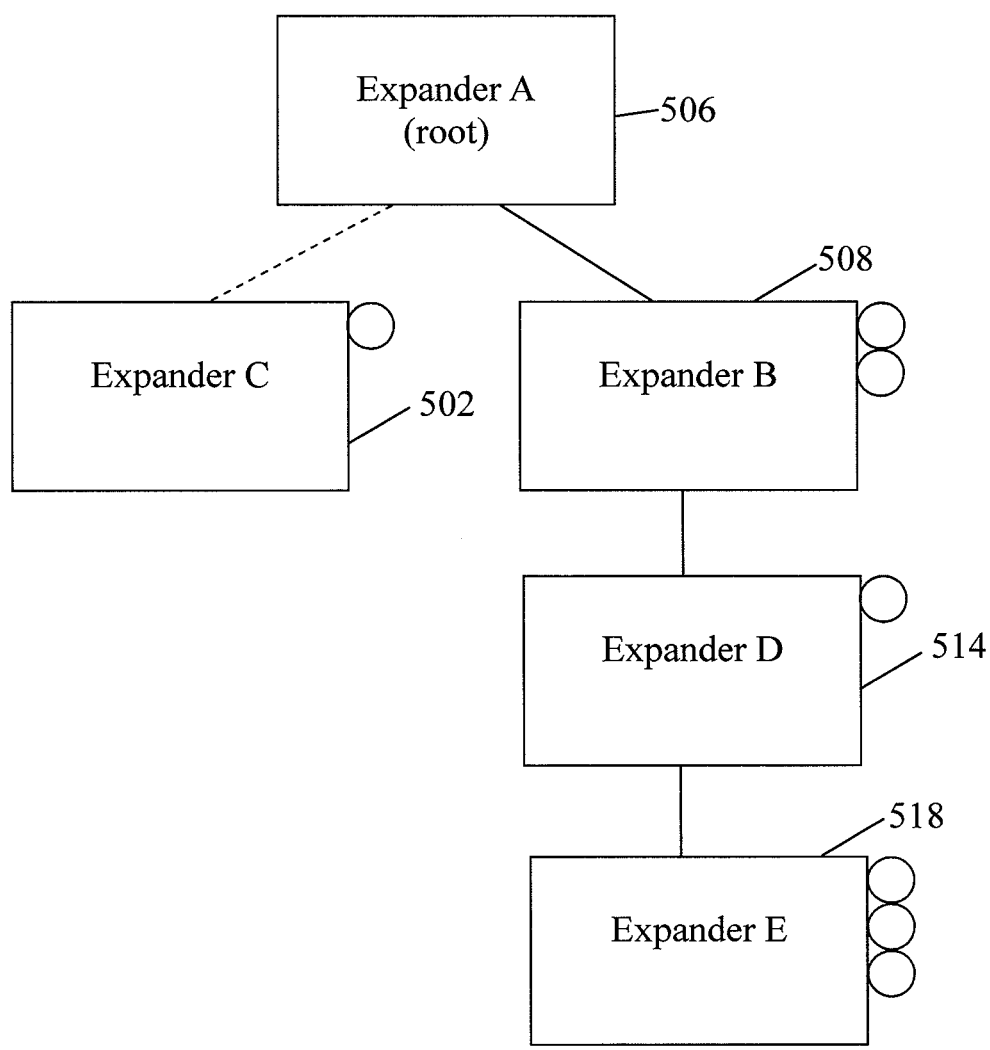
FIG. 8 illustrates another possible topology of an importing domain that matches the exporting domain.

FIG. 8 illustrates another importing domain 800, which utilizes expander A 506 as the root expander. Root expander A 506 is connected to expander C 502 and expander B 508. Expander B 508 is connected to expander D 514 and expander E 518. A comparison of importing domain 800 of FIG. 8 with exporting domain 400 of FIG. 4 indicates that there is a match between the topologies of these two domains. Since there is a match of topologies, the process of porting topology information can be performed. In this manner, by rotating the root expander, to each of the expanders, the process of determining if there is a match between topologies can be performed.

Figure 9:
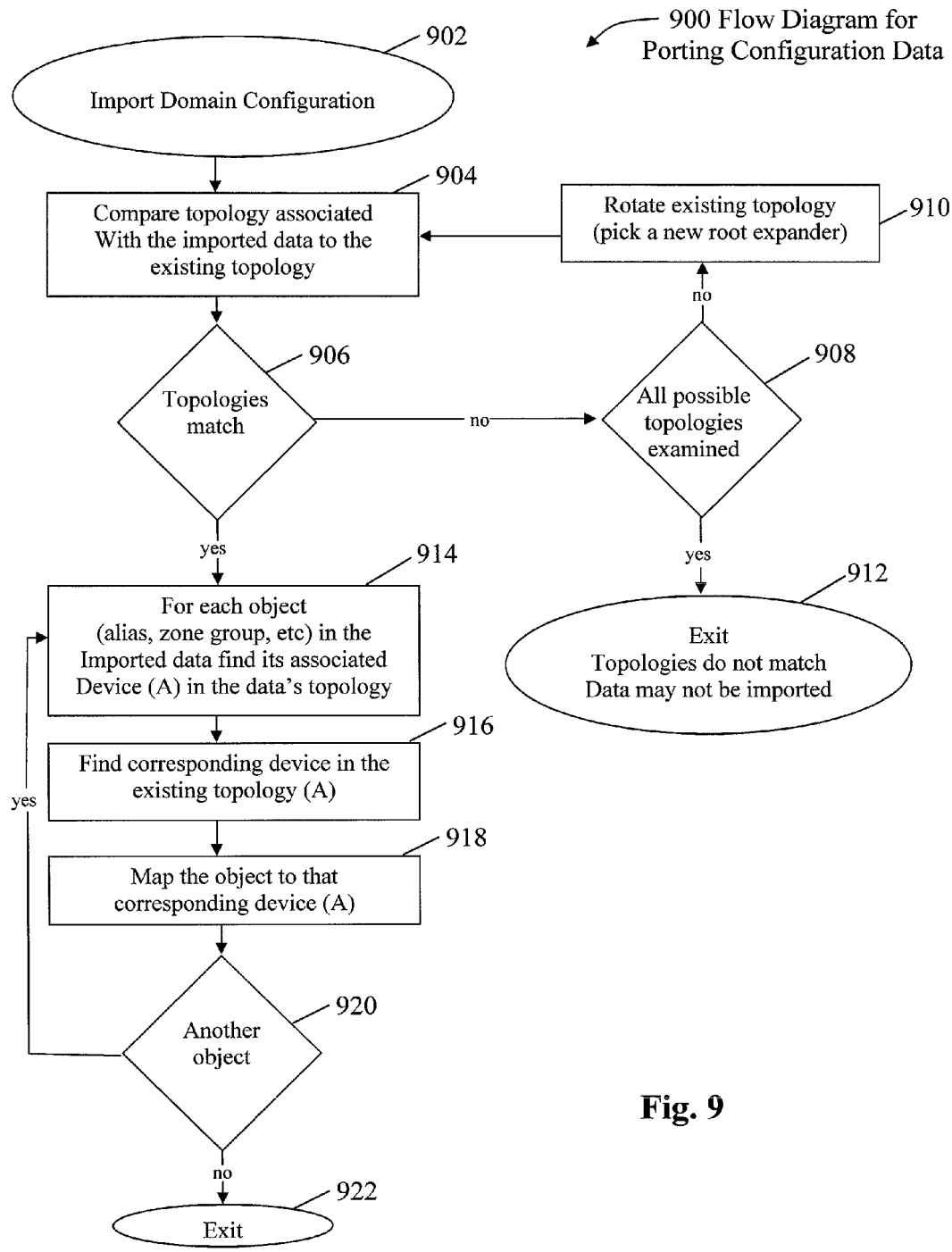
FIG. 9 is a flow diagram for porting configuration data.

FIG. 9 is a flow diagram of one embodiment for porting configuration data. As illustrated in FIG. 9, the domain configuration of a first domain (an export domain) is imported by the management application at step 902. At step 904, the management application compares the topology of a second domain with the imported domain configuration of the second domain. At step 906, if the topologies do not match, the process proceeds to step 908. At step 908, it is determined whether all the different possibilities of topologies have been examined. If they have, the process proceeds to step 912 and it is determined that the topologies do not match and may not be imported. If all possible topologies have not been examined at step 908, the process proceeds to step 910. At step 910, the topology of the second domain is rotated, so that a new root expander is designated. The process then proceeds to step 904 to compare the topology of domain 1 with the topology of domain 2. The process then proceeds to step 906 to then determine if the newly rotated topology of the second domain matches the first domain. This loop proceeds until a match is determined, or to determine if there is no match. If a match is determined, the process proceeds to step 914. At step 914, each device, including aliases and zone groups of the first domain are compared to find the associated devices, including aliases and zone groups in the second domain. The process then proceeds to step 916, where the corresponding device in the second domain is determined. At step 918, the object in the first domain is mapped to the corresponding device in the second domain. At step 920, it is determined whether there is another object in the first domain that needs to be mapped to the second domain. If there is, the process returns to step 914 to locate that object. If there are no other objects, the process proceeds to step 922 to exit.

Figure 10:
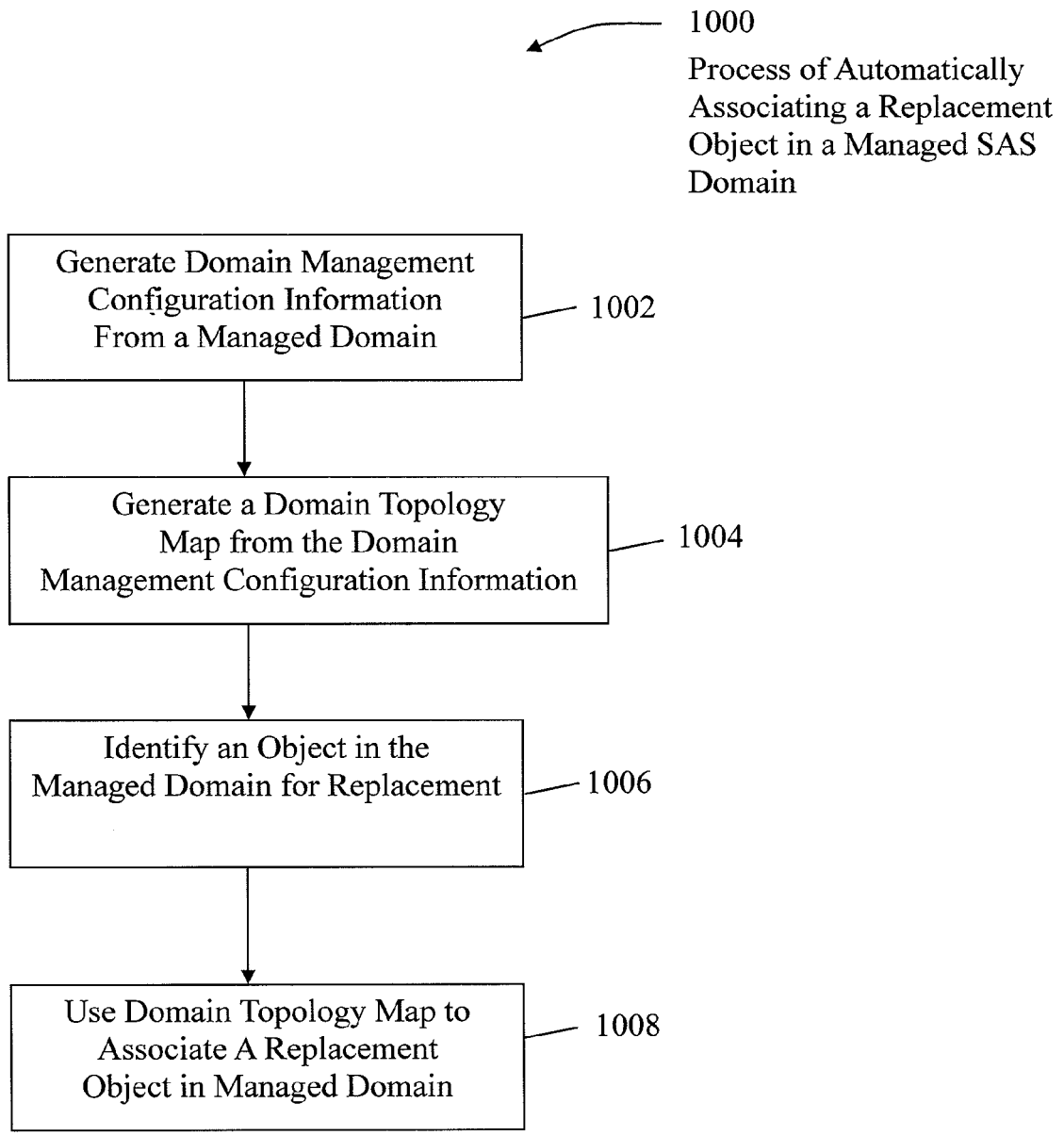
FIG. 10 is a flow diagram illustrating a process for automatically associating a replacement object in a managed SAS domain.

FIG. 10 is a flow diagram illustrating a process 1000 for automatically associating a replacement object in a managed SAS domain. As shown in FIG. 10, at step 1002, domain management configuration information is generated for a managed domain. At step 1004, a domain topology map is generated from the domain management configuration for the managed domain. At step 1006, an object is identified in the managed domain for replacement. At step 1008, the domain topology map is used to associate a replacement object in the managed domain in an automated fashion in the management application.

Hence, the SAS domain management application is capable of decoupling the SAS address relationships, which bind the objects to a managed domain and allow the management application to map the topology of a first domain to a second domain. The process performed by the SAS domain management application in mapping topology information from one domain to another frees the administrator from the task of manually duplicating similar objects in multiple, but similar, managed domains. Further, this process cannot only be used to map one domain to another, but also may be used to automatically associate replacement devices with predecessor management objects.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of porting SAS domain configuration data in an SAS network from a first SAS domain to a second SAS domain comprising:

creating a first SAS domain topology map for said first SAS domain having a first SAS domain topology that lists first devices in said first SAS domain, SAS addresses of said first devices, and SAS addresses of first parent devices of said first devices and physical interconnections between said first devices and said first parent devices;

creating a second SAS domain topology map for a second SAS domain having a second SAS domain topology that lists second devices in said second SAS domain, SAS addresses of said second devices, and SAS addresses of second parent devices of said second devices and physical interconnections between said first devices and said first parent devices;

comparing said first SAS domain topology map with said second SAS domain topology map;

matching said first devices and relational interconnections of said first devices with said first parent devices in said first SAS domain topology map with said second devices and relational interconnections of said second devices with said second parent devices in said second SAS domain topology map to identify correspondence between said first devices and relational interconnections of said first devices with said first parent devices in said first SAS domain topology map and said second devices and said relational interconnections of said second devices with said second parent devices in said second SAS domain topology;

if said first SAS domain topology map does match said second SAS domain topology map, mapping said SAS domain configuration data from said first domain topology map to said second domain topology map based on said relational interconnections that provide relative positions of said first devices and first parent devices in said first domain topology map with corresponding second devices and second parent devices in said second domain topology map.

2. The method of claim 1 further comprising:

sequentially selecting expanders in said second SAS domain as root expanders to obtain a series of additional topologies for said second SAS domain whenever said first domain topology map does not match said second domain topology map;

comparing said series of additional topologies for said second SAS domain with said first SAS domain topology to obtain a second SAS domain topology from said series of additional topologies that matches said first SAS domain topology.

3. A method of automatically associating a replacement device in a managed SAS domain, the method comprising:

generating domain management configuration information for a SAS domain using physical addresses and SAS addresses;

generating a domain topology map based on the domain management configuration information, wherein the domain topology map indicates relative positions of SAS devices on the SAS domain with respect to other SAS devices on the domain;

identifying a device in the domain topology map for replacement;

using the physical addresses and the SAS addresses of the device to import the replacement device into the SAS domain, by matching configuration information between the device and the replacement device, based on the relative positions of SAS devices on the SAS domain indicated by the topology map.

4. A method of porting domain configuration data from a first domain to a second domain comprising:

creating a first SAS domain topology map for said first SAS domain having a first SAS domain topology that lists first devices in said first SAS domain, SAS addresses of said first devices, and SAS addresses of first parent devices of said first devices;

creating a second SAS domain topology map for a second SAS domain having a second SAS domain topology that lists second devices in said second SAS domain, SAS addresses of said second devices, and SAS addresses of second parent devices of said second devices;

comparing said first SAS domain topology map with said second SAS domain topology map;

matching said first devices and relational interconnections of said first devices with said first parent devices in said first SAS domain topology map with said second devices and relational interconnections of said second devices with said second parent devices in said second SAS domain topology map to identify correspondence between said first devices and relational interconnections of said first devices with said first parent devices in said first SAS domain topology map and said second devices with said second parent devices in said second SAS domain topology;

if said first SAS domain topology map does match said second SAS domain topology map, mapping said SAS domain configuration data from said first devices in said first domain topology map to corresponding second devices in said second domain topology map based on physical connections between said first devices in said first SAS domain and said corresponding second devices in said second SAS domain as determined by relative positions of said first device in said first SAS domain topology map and corresponding second devices in said second SAS domain topology map.

5. The method of claim 4 further comprising:

sequentially selecting expanders in said second SAS domain topology map as root expanders to obtain a series of additional SAS topologies for said second SAS domain whenever said first SAS domain topology map does not match said second SAS domain topology map;

comparing said series of additional SAS topologies for said second SAS domain with said first SAS domain topology map to obtain a second SAS domain topology map from said series of additional topologies that matches said first SAS domain topology map.

6. The method of claim 1, wherein:

comparing the first SAS domain topology map with the second SAS domain topology map comprises selecting an expander as a root expander of the second SAS domain.

7. The method of claim 6, wherein:

selecting an expander as a root expander comprises selecting an expander of the second SAS domain having a highest SAS address.

8. The method of claim 1, wherein:

a match does not exist between the first SAS domain topology map and the second SAS domain topology map unless:

there are the same number of devices in the second SAS domain as the first SAS domain, or there are fewer devices in the first SAS domain than the second SAS domain.

9. The method of claim 1, further comprising:

assigning new SAS addresses to the first devices or the second devices.

10. The method of claim 1, wherein:

the first SAS domain topology map lists the same types of information as the second SAS domain topology map.

11. The method of claim 1, further comprising:

comparing aliases and zone groups of the first SAS domain topology map with aliases and zone groups of the second SAS domain topology map.

12. The method of claim 1, wherein:

the first SAS domain topology map additionally lists a number of physical PHYs for each of the first devices, and PHY identifiers for each of the first devices.

13. The method of claim 1, further comprising:

comparing PHY identifiers of the first parent devices with PHY identifiers of the second parent devices.

14. The method of claim 4, wherein:

comparing the first SAS domain topology map with the second SAS domain topology map comprises selecting an expander as a root expander of the second SAS domain.

15. The method of claim 14, wherein:

selecting an expander as a root expander comprises selecting an expander of the second SAS domain having a highest SAS address.

16. The method of claim 4, wherein:

a match does not exist between the first SAS domain topology map and the second SAS domain topology map unless:

there are the same number of devices in the second SAS domain as the first SAS domain, or there are fewer devices in the first SAS domain than the second SAS domain.

17. The method of claim 4, further comprising:

assigning new SAS addresses to the first devices or the second devices.

18. The method of claim 4, wherein:

the first SAS domain topology map lists the same categories of information as the second SAS domain topology map.

19. The method of claim 4, further comprising:

comparing aliases and zone groups of the first SAS domain topology map with aliases and zone groups of the second SAS domain topology map.

20. The method of claim 4, wherein:

the first SAS domain topology map additionally lists a number of physical PHYs for each of the first devices, and PHY identifiers for each of the first devices.

* * * * *